United States Patent [19]

Lam

[11] Patent Number: 5,835,574
[45] Date of Patent: Nov. 10, 1998

[54] DUAL-TONE MULTI-FREQUENCY SIGNAL TRANSFER PROTOCOL

[75] Inventor: Chi K. Lam, Morganville, N.J.

[73] Assignee: AT&T Corp, Middletown, N.J.

[21] Appl. No.: 766,097

[22] Filed: Dec. 16, 1996

[51] Int. Cl.[6] .......................... H04M 11/00; H04B 1/38; H04J 3/12
[52] U.S. Cl. .................................. 379/90.01; 379/90.01; 379/93.01; 379/93.08; 379/93.31; 379/93.32; 379/93.33; 379/93.34; 375/222; 370/525; 370/526
[58] Field of Search .............................. 379/209, 91.01, 379/91.02, 93.08, 93.18, 93.26, 93.28, 93.31, 93.32, 93.33, 93.34, 90.01, 100.17; 375/222; 370/525, 526

[56] References Cited

U.S. PATENT DOCUMENTS

| | | | |
|---|---|---|---|
| 4,694,450 | 9/1987 | Staab | 379/93.32 |
| 4,771,417 | 9/1988 | Maxwell et al. | 379/93.33 |
| 5,153,897 | 10/1992 | Sumiyoshi et al. | 379/93.34 |
| 5,418,842 | 5/1995 | Cooper | 379/93.08 |
| 5,577,105 | 11/1996 | Baum et al. | 379/93.05 |
| 5,581,560 | 12/1996 | Shimada et al. | 379/96.31 |

*Primary Examiner*—Daniel S. Hunter
*Assistant Examiner*—Benny Q. Tieu
*Attorney, Agent, or Firm*—Robert B. Levy

[57] ABSTRACT

A handshake between sending and receiving devices (10) that exchange DTMF signals across a network (14) is accomplished by having the receiving device send a DTMF ready tone (digit) for a prescribed interval following receipt of a call set-up message received after the sending device has initiated a call. Upon receipt of the DTMF ready digit, the sending device sends to the receiving device a data message includes a string of digits of interest prefixed by M header digits. After receiving at least a portion of the data message, the receiving device stops transmitting the ready digit. Once the receiving device has received the entire data message, the receiving device strips the protocol digits (the M header digits and any of the ready digits received due to echo). By analyzing the stripped protocol digits, the quality of the handshake between the receiving and sending devices can be determined.

10 Claims, 1 Drawing Sheet

DUAL-TONE MULTI-FREQUENCY SIGNAL TRANSFER PROTOCOL

TECHNICAL FIELD

This invention relates to a technique for rapidly effecting a handshake to enable the transfer of Dual-Tone Multi-Frequency signals between devices.

BACKGROUND ART

Within a telecommunications network, Dual-Tone Multi-Frequency (DTMF) signals, representing dialed digits, commonly pass between different customer premises equipment over an in-band (voice) channel. For example, a merchant seeking to verify the authenticity of a credit card typically transmits the credit card number as a string of DTMF digits via a credit card verifier terminal to a computer maintained by a credit agency that stores a list of valid card numbers. Upon receipt of the credit card number, the credit agency's computer will transmit a return string of DTMF digits to the merchant's credit card verifier terminal indicating whether the credit card in question is valid. Another instance where DTMF digits are transmitted between different devices occurs in connection with international call-back services.

In some instances, the in-band voice channel is not sufficiently established prior to the transmission of DTMF digits between the sending and receiving devices. If data transfer is initiated prior to establishing the voice channel, then part of the string of DTMF digits sent from the sending device will be lost, resulting in incomplete data transfer. In the past, this problem has been addressed in two ways. One approach is to have the transmitting device receive a signal when the receiving device has picked up the call. To that end, the telecommunications network generates an answer supervision signal for this purpose. This approach suffers from the disadvantage that the transmitting device must possess an appropriate network interface to receive the answer supervision signal.

Another approach is to provide a fixed delay of N seconds (where N is an integer) after initiating the call before transmitting DTMF digits from the transmitting device to the receiving device to ensure readiness of the in-band channel. This method suffers from the drawback that a large delay interval creates poor response time. On the other hand, reducing the fixed delay interval to increase response time may not provide sufficient time to allow establishment of the voice channel.

Thus, there is a need for a DTMF signal transfer protocol that detects establishment of a voice channel without the foregoing disadvantages.

BRIEF SUMMARY OF THE INVENTION

Briefly, in accordance with the invention, a method is provided for transferring DTMF signals (digits) between sending and receiving devices across a network. The method is commenced by initiating a call from the sending device to the receiving device by sending a call set up message to the receiving device. The call set-up message may simply comprise a ringing voltage in the case of Plain Old Telephone Service (POTS) or a string of characters in the case of ISDN service. Upon receipt of the call set up message, the receiving device sends a DTMF ready digit, such as the digit *, for N seconds, where N is an integer. The DTMF ready digit is detected at the sending device, which, in response, sends to the receiving device a data message. The data message comprises M DTMF header digits, where M is an integer, each header digit typically comprising the digit #. The header digits are followed by a sequence of DTMF digits representing actual data of interest. The receiving device receives the data message and upon receipt of $P^{th}$ DTMF digit in the data message (where P is an integer), the receiving device stops generating the DTMF ready digit. The receiving device thereafter strips from the received data message all protocol digits. The protocol digits include the M DTMF header digits as well as any DTMF ready digits appearing in the received data message as a result of echo.

From the stripped DTMF protocol digits, the receiving device can determine the accuracy of the received data. If the stripped DTMF protocol digits includes only the M header digits and no ready digit, no echo is present and the handshake is good. However, if any ready digit appears after receiving the last of the M header digits, then an echo is present that may corrupt the actual data. Thus, the presence of a ready digit after the last of the M header digits indicates a bad hand shake between the receiving and transmitting device.

DETAILED DESCRIPTION

Figure 1:
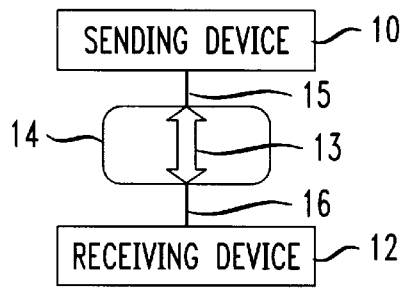
FIG. 1 is a block schematic diagram of a sending device and a receiving device that exchange DTMF signals (digits) across a telecommunications network.

FIG. 1 shows a sending device 10 for exchanging DTMF signals (digits) with a receiving device 12 across a voice channel 13 in telecommunications network 14. Typically, the sending and receiving devices 10 and 12 are connected to the network 14 via telephone lines 15 and 16, respectively, each having unique line numbers. The sending and receiving devices 10 and 12, respectively, may take various forms. For example, the sending device 10 may comprise a credit card verifier terminal whereas the receiving device 12 may comprise a computer programmed to communicate with the credit card verifier terminal. As will be appreciated from the discussion below, the specific nature of the sending and receiving devices 10 and 12, respectively, is not important, as long as each device has the capability of sending and receiving DTMF digits.

A common problem associated with the exchange of DTMF digits between the sending and receiving devices 10 and 12, respectively, is the inability to establish the voice channel 13 in the network 14 in a timely fashion prior to commencing transmission of digits across the channel. Typically, the voice channel 13 is established when the sending device 10 initiates a call to the receiving device 12 by dialing the digits of the telephone line 15 associated with the receiving device. The network 14 receives the dialed digits and, in response, seizes the voice channel 13 while sending a call set-up message to the receiving device 12. The call set-up message may comprise a ringing voltage in the case of POTS service, or a string of data characters in the case of ISDN service.

Some times, the receiving device answers the incoming call following receipt of the call set up message before the voice channel 13 is sufficiently established. If the sending device 10 transmits any DTMF digits before the voice channel 13 is established, then some of the digits may be lost. Consequently, the information received by the receiving device 12 may not be accurate. Previously, this problem was avoided by imposing a fixed delay after initiating a call from the sending device 10 to the receiving device 12 prior to sending DTMF digits. Such a fixed delay interval often results in poor response time.

Figure 2:
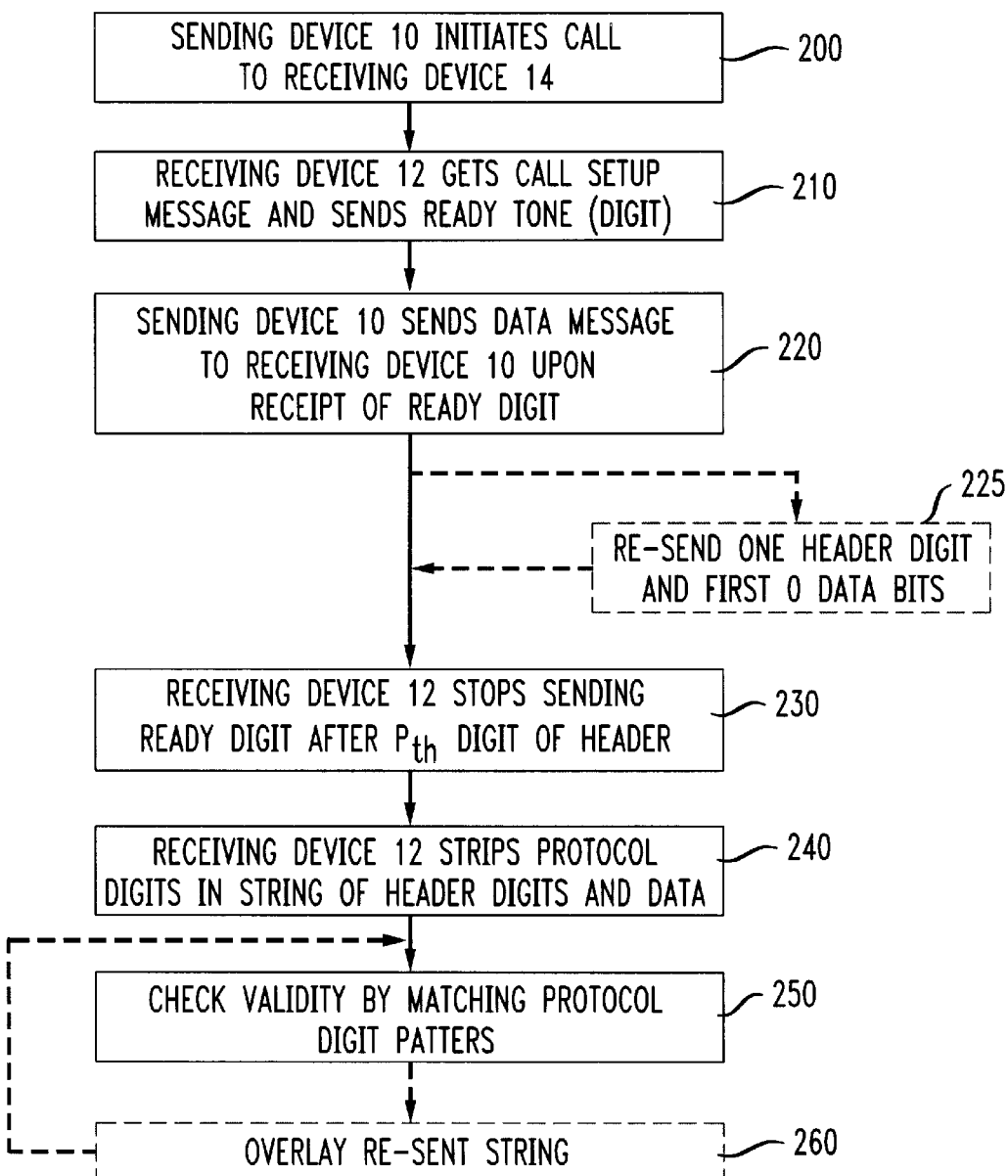
FIG. 2 is a flow-chart representation of a protocol, in accordance with the invention, for facilitating DTMF digit transfer between the sending and receiving devices of FIG. 1.

Referring to FIG. 2, there is shown a flow chart diagram of a method for rapidly effecting a handshake to enable the transfer of Dual-Tone Multi-Frequency signals between devices 10 and 12, respectively, of FIG. 1 without the need to impose a fixed delay interval prior to transmission. The DTMF transfer protocol of the invention commences when the sending device 10 of FIG. 1 initiates a call to the receiving device 12 of FIG. 1 (step 200 of FIG. 2). Typically, the sending device 10 initiates the call by dialing the digits of the telephone line 16 of the receiving device 12. The network 14 receives the dialed digits from the sending device 10 across the line 15 and proceeds to seize the voice channel 13 while sending a call set-up message to the receiving device 12. The receiving device 12 receives the call set-up message, and in response sends a ready DTMF digit (step 210) for N seconds, where N is an integer representing the maximum signal delay in the network 14. In practice, the receiving device sends the ready digit * for three seconds (N=3). In practice, 99.99% of the network delay time falls within 3 seconds.

The ready digit sent by the receiving device serves as an answer supervision signal for the transmitting device 10. The ready digit will eventually be heard even if the voice channel is not completely established at the beginning of call set-up. The sending of the ready digit for N seconds also solves the problem of different DTMF detection intervals. Detection of a DTMF digit, such as the ready digit, may take between 60 ms and 200 ms. Thus by transmitting the ready digit for 3 seconds, receipt of the ready digit by the sending device 10 is virtually assured.

Upon receipt of the ready digit from the receiving device 12, the sending device 10 sends a data message to the receiving device. The data message includes M (where M is an integer) header digits (each typically comprising the digit #), followed by a sequence of digits representing actual data of interest (e.g., 123456789123). The integer M corresponds to the average time elapsed before hearing the echo back. Typically, M is three, indicating that the time to transmit three DTMF digits is typically ~300 ms. Typically, 90% of all echo falls within 300 ms. When M=3 and each header digit is #, and assuming the actual data sent comprises the digits 123456789123, the string of digits sent by the sending device would be ###123456789123.

Prefixing M digits to the actual data stream provides a mechanism for verifying the validity of the data. If echo is present on the transmission path (comprising the voice channel 13 and the lines 15 and 16, all of FIG. 1), the receiving device 12 will hear the ready tone it sends. Should there be an echo, then the receiving device 12 would likely hear the ready tone in place of one of the M header digits. As will be discussed below, the presence of the M header digits is used to detect such echo.

In some instances when the transmission quality is poor, it may be desirable (although not necessary) to re-send the first O (where O is an integer) digits of the actual data prefixed by a header digit(step 225). The integer O represents the maximum echo time delay in seconds in the network 14 for DTMF digit transfer. Setting O to 10 corresponds to a delay ~1 second. (Almost 99.9% of all echo falls within 1 second, excluding satellite transmission.) Thus, when O equal 10, the re-sent string will comprise the digits #1234567891.

As mentioned previously, the M digits prefixed to the actual data will address the problem of echo. However, if the echo problem is serious, then data re-transmission is inevitable. Typically, an echo in the transmission path will only corrupt the first O digits so only these digits need to be re-sent. Re-transmission typically occurs about the same time that the receiving device is processing the originally sent string.

Following step 220 (or step 225 if data -re-transmission occurs), then step 230 is executed, whereupon the receiving device 12 of FIG. 1 stops sending the ready digit * after receiving the $P^{th}$ (where P is an integer) digit in the data message sent by the sending device 10. The integer P represents the maximum interval for detecting DTMF digits. In practice, P=2, representing a detection interval of ~200 ms. Stopping the ready digit stops the echo on the transmission path. If there is echo, the first digit received by the receiving device 10 will be the ready digit. By minimizing the value of P, the echo problem is minimized.

Next, the receiving device 12 strips the "protocol" digits from the data message received from the sending device 10 (step 240). The protocol digits include the header digits as well as any ready digits that may be present. Recall that the string of digits representing actual data (e.g., the string 123456789123) is prefixed with M header digits (each typically comprising the digit #). Thus, the data message received by the receiving device 12 should include M header digits. Stripping off the M header digits should yield only the data of interest. However, if an echo exists in the transmission path, then the data message sent by the sending device 10 will likely include one or more ready digits *.

Following step 240, the receiving device 12 validates the accuracy of the received data in accordance with the stripped off protocol digits (step 250). As discussed above with respect to step 240, the data message sent by the sending device during step 220 includes M header digits. If only M header digits were stripped off during step 240, then, no echo exists on the transmission path, and the handshake between the sending and receiving devices 10 and 12, respectively, is good. (If all of the header digits were correctly received, then it is likely that all of the digits of actual data would be correctly received as well.) Any missing header digits suggests that digits represent actual data may also be lost.

As also discussed, should one or more ready digits (each typically comprising the digit *) appear among the protocol digits stripped off during step 240, then an echo is present on the transmission path. Any echo on the transmission path causes the receiving device 12 to hear the ready digit sent to the sending device during step 210, causing one or more ready digits to appear in the string of digits received by the receiving device.

If data re-transmission occurred during step 225 and, the accuracy of the data validated during step 250 was poor, then the re-sent data is merged with previously send data, and step 250 is re-executed. Assuming that O=10, then the maximum time spent on re-transmission is approximately one second. In practice, the additional time spent to resend data dramatically increases the reliability of data transfer.

The foregoing describes a DTMF transfer protocol that rapidly validates the handshake between sending and receiving devices 10 and 12, respectively, without regard to the speeds of transmission and the DTMF detection interval. The protocol can readily be implemented on a variety of sending and receiving devices that operate to exchange DTMF signals (digits) across a voice channel 13 in a network 14.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for rapidly effecting a handshake to enable the transfer of Dual-Tone Multi-Frequency signals (digits) between devices connected by a network, comprising the steps of:

initiating a call from the sending device to the receiving device across the network, by sending a call set-up message to the receiving device;

transmitting from the receiving device to the sending device a DTMF ready digit for N (where N is an integer) seconds following receipt by the receiving device of the call set-up message;

detecting, at the sending device, the continuous DTMF ready digit, and, in response, sending to the receiving device a data message having M DTMF header digits followed by a sequence of DTMF signals representing actual data of interest;

receiving, at the receiving device, the data message and upon receipt of P (where P is an integer) digits in the data message, discontinuing transmission of the DTMF ready digit;

stripping from the data message received at the receiving device both the M DTMF header digits, and any DTMF ready digits present as a result of echo; and validating the received data message in accordance with the stripped DTMF digits.

2. The method according to claim 1 further including the step of resending to the receiving device a string of O digits (where O is an integer) of actual data in the data message prefixed by said M header digits.

3. The method according to claim 2 wherein O is 10.

4. The method according to claim 2 wherein the O re-sent digits are overlaid with the corresponding digits in the originally transmitted data message in the event of echo in the network.

5. The method according to claim 1 wherein the DTMF ready digit is a *.

6. The method according to claim 1 wherein the DTMF ready digit is sent for three seconds (N=3).

7. The method according to claim 1 wherein the data message includes three DTMF header digits (M=3).

8. The method according to claim 1 wherein each DTMF header digit comprises a #.

9. The method according to claim 1 wherein the validating step includes the step of comparing the number of DTMF header digits stripped from the received data message to the number of DTMF header digits in the sent data message.

10. The method according to claim 1 wherein the validating step includes the step of determining whether any DTMF ready digits are among the DTMF digits stripped from the received data message.

* * * * *